Nov. 8, 1960  E. WAGNER  2,958,937
HARD SOLDERING OF DIFFICULTLY SOLDERABLE MATERIALS
Filed March 24, 1958
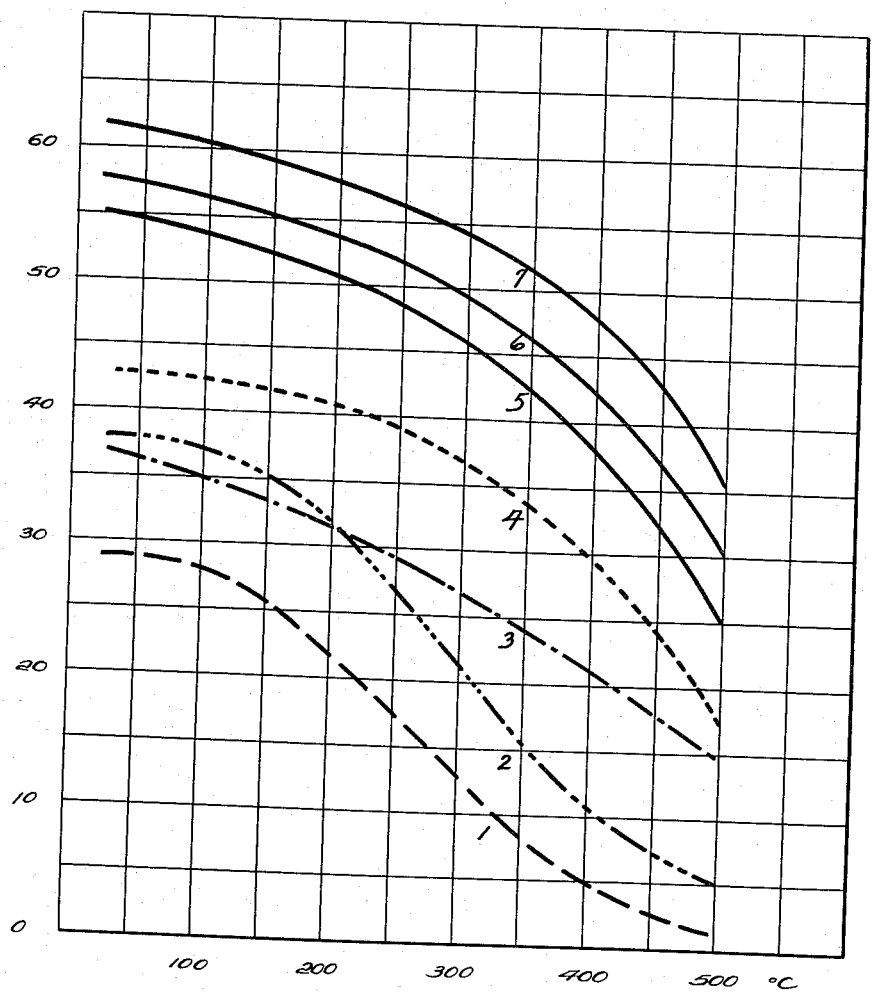
INVENTOR
EWALD WAGNER,
BY
ATTORNEYS

United States Patent Office 2,958,937
Patented Nov. 8, 1960

2,958,937

HARD SOLDERING OF DIFFICULTLY SOLDERABLE MATERIALS

Ewald Wagner, Pforzheim, Germany, assignor to Deutsche Gold- und Silber-Scheideanstalt vormals Roessler, Frankfurt am Main, Germany Filed Mar. 24, 1958, Ser. No. 723,483

Claims priority, application Germany Aug. 27, 1955

8 Claims. (Cl. 29—194)

The present invention relates to improvements in hard soldering alloys and the art of hard soldering therewith to produce soldered joints of high mechanical strength which are resistant to high temperatures.

A number of properties are required in an alloy for it to be suited as a solder for joining metallic materials. For example, the flow characteristics and the wetting ability of the melted solder, its working temperatures and its strength at higher temperatures are of special importance. Furthermore, the solder alloy itself must be sufficiently workable in order that it can be produced in suitable form, for example, as a wire or sheet.

In soldering of difficultly solderable materials, such as chromium nickel steels, alloys stable at high temperatures, stellites and hard metals (sintered or cemented carbides) and the like, it was previously impossible simultaneously to satisfy all of the requirements satisfactorily. Of course, a number of steel and hard metal solders are already known, but generally usable results could only be attained with them at the expense of some of the desired properties.

According to the invention it was unexpectedly found that cobalt-copper-manganese-palladium alloys possess excellent properties as hard solders and that their mechanical strength at elevated temperatures is particularly improved by the palladium contained therein. The alloys according to the invention contain 1 to 10% of cobalt, 55 to 90% of copper, 4 to 35% of manganese and 1 to 30%, preferably 5 to 30%, of palladium. Preferably the alloys according to the invention contain 2.5% to 7.5% of cobalt, 60 to 85% of copper, 5 to 20% of manganese and 10 to 25% of palladium. An especially characteristic representative of the solders according to the invention consists of 4% of cobalt, 61% of copper, 10% of manganese and 25% of palladium.

The alloys according to the invention not only possess sufficient hardness but also when employed as solders for steels, hard metals and other difficultly solderable metal possess excellent spreading and wetting properties. In addition, such alloys have particularly good strength at higher temperatures and furthermore are amenable to heat treatment so that their mechanical properties can be further improved by a simple heat treatment.

The accompanying drawing shows a graph comparing the strength of soldered joints obtained with the soldering alloys according to the invention with that of joints obtained with known alloys at various temperatures.

In such graph the temperatures are given on the abscissa axis and the tensile strength of the joints is given in kg./cm.$^2$ on the ordinate axis. Curves 1—4 in such graph show the values obtained respectively with the following known alloys:

Curve 1—LAg 45 (44–46% Ag, 18–22% Cd, up to 19% Cu, remainder Zn)

Curve 2—LAg 49 (48–50% Ag, up to 18% Cu, up to 8% Mn, up to 5% Ni, remainder Zn)

Curve 3—85% Ag, 15% Mn

Curve 4—4% Co, 86% Cu, 10% Mn

Curves 5–7 in such graph show the values obtained with the following alloys according to the invention:

Curve 5—4% Co, 71% Cu, 20% Mn, 5% Pd

Curve 6—4% Co, 84% Cu, 10 Mn, 2 Pd

Curve 7—4% Co, 61% Cu, 10% Mn, 25% Pd.

The strength of the soldered joints obtained with the Pd containing alloys according to the invention only noticeably decreases at temperatures over 300° C. Particularly high strengths at high temperatures are obtained when a high palladium content, 10% up to 30%, is present. For example, in the 25% Pd alloy, represented by curve 7, its strength at 400° C. is still 77.5% and at 500° C. is still 58% of its original strength at room temperatures.

The palladium in the alloys according to the invention not only increases the strength of the soldered joints obtained therewith at high temperatures but also enhances the wetting of surfaces to be soldered therewith containing chromium, tungsten or molybdenum.

The following Table 1 gives a number of soldering alloys according to the invention, indicating their melting point range, as well as their hardness after quenching of the samples from 800° C. in water (HV in kg./mm.$^2$, 15′ 800° C./H$_2$O):

Table 1

| Solder | Composition in Percent | | | | M.P. range in ° C. | HV in kg./mm.$^2$ 15′ 800° C./H$_2$O |
|---|---|---|---|---|---|---|
| | Co | Cu | Mn | Pd | | |
| (I)— | | | | | | |
| a | 4 | 84 | 10 | 2 | 1,010–970 | 86 |
| g | 4 | 74 | 20 | 2 | 920–880 | 94 |
| (II)— | | | | | | |
| b | 4 | 81 | 10 | 5 | 1,010–950 | 96 |
| h | 4 | 71 | 20 | 5 | 930–890 | 102 |
| (III) | | | | | | |
| e | 2.5 | 77.5 | 10 | 10 | 1,000–960 | 102 |
| c | 4 | 76 | 10 | 10 | 1,010–950 | 114 |
| f | 7.5 | 72.5 | 10 | 10 | 1,100–975 | 124 |
| i | 4 | 66 | 20 | 10 | 950–900 | 118 |
| d | 4 | 66 | 10 | 20 | 1,030–970 | 124 |
| k | 4 | 61 | 10 | 25 | 1,040–990 | 177 |

The soldering alloys according to the invention can be age hardened by heat treatment as can be seen from the following Table 2. In such table, AZ is the original hardness of the samples, HV in kg./mm.$^2$ in quenched condition (15′ 800°/H$_2$O) before the ageing heat treatments.

Table 2

| Solder | Composition in Percent | | | | AZ | HV in kg./mm.$^2$ aged 15 min. at ° C. | | | | | | |
|---|---|---|---|---|---|---|---|---|---|---|---|---|
| | Co | Cu | Mn | Pd | | 200 | 300 | 400 | 500 | 600 | 700 | 800 |
| g | 4 | 74 | 20 | 2 | 94 | 106 | 116 | 130 | 145 | 132 | 120 | 102 |
| c | 4 | 76 | 10 | 10 | 114 | 120 | 124 | 130 | 160 | 128 | 114 | 112 |
| k | 4 | 61 | 10 | 25 | 177 | 177 | 191 | 357 | 323 | 227 | 198 | 163 |

Soldered seams produced with the alloys according to the invention when soldering steels, such as, for example, 18/8 steel, and hard metals, such as, for example, those consisting of about 84% tungsten carbide with about 11% Co and about 94% tungsten carbide with about 6% Co have excellent tensile strengths. The soldered seams produced according to the invention also have high shearing strengths, particularly at elevated temperatures.

The soldering alloys according to the invention are suitable for soldering alloyed or unalloyed metals of all sorts, heat resistant materials, high speed steels and hard metals. They are particularly advantageous in the production of tools provided with hard metal inserts used in mining and stone work, for example, excavating equipment and pneumatic drills in which the soldered joint is subjected to especially stringent mechanical and thermal requirements.

For certain applications, the solders according to the invention can also contain additions of chromium, silver and, under certain circumstances, also gold, titanium and vanadium. Gold enhances the wetting of the surfaces to be soldered which contain chromium, tungsten or molybdenum. The total quantity of such additions can be from 1% to 10% and furthermore should not exceed the quantity of palladium in the alloy.

The hard solder alloys according to the invention can be employed with the usual hard soldering techniques.

This application is a continuation-in-part of application S.N. 603,987, filed August 14, 1956.

I claim:

1. In a method of hard soldering materials selected from the group consisting of steels, stellites and cemented carbides, the step which comprises soldering such materials with a solder essentially composed of 1 to 10% of cobalt, 55 to 90% of copper, 4 to 35% of manganese and 1 to 30% of palladium.

2. In a method of hard soldering materials selected from the group consisting of steels, stellites and cemented carbides, the step which comprises soldering such materials with a solder essentially composed of 2.5 to 7.5% of cobalt, 60 to 85% of copper, 5 to 20% of manganese and 10 to 25% of palladium.

3. A soldered joint between two workpieces selected from the group consisting of steel, stellite and cemented carbide workpieces in which the workpieces are joined by a hard solder essentially composed of 1 to 10% of cobalt, 55 to 90% of copper, 4 to 35% of manganese and 1 to 30% of palladium.

4. A soldered joint between two workpieces selected from the group consisting of steel, stellite and cemented carbide workpieces in which the workpieces are joined by a hard solder essentially composed of 2.5 to 7.5% of cobalt, 60 to 85% of copper, 5 to 20% of manganese and 10 to 25% of palladium.

5. A soldering alloy essentially composed of 1 to 10% of cobalt, 55 to 90% of copper, 4 to 35% of manganese and 1 to 30% of palladium.

6. A soldering alloy essentially composed of 2.5 to 7.5% of cobalt, 60 to 85% of copper, 5 to 20% of manganese and 10 to 25% of palladium.

7. A soldering alloy essentially composed of 4% of cobalt, 61% of copper, 10% of manganese and 25% of palladium.

8. A soldering alloy essentially composed of 1 to 10% of cobalt, 55 to 90% of copper, 4 to 35% of manganese and 1 to 30% of palladium and 1 to 10% of at least one additional alloying component selected from the group consisting of chromium, silver, gold, titanium and vanadium, the total quantity of such additional component not exceeding the palladium content of the alloy.

References Cited in the file of this patent

UNITED STATES PATENTS

| | | |
|---|---|---|
| 2,341,716 | Herdman | Feb. 15, 1944 |
| 2,450,340 | Hensel | Sept. 28, 1948 |
| 2,685,893 | Phipps | Aug. 10, 1954 |

FOREIGN PATENTS

| | | |
|---|---|---|
| 862,261 | France | Mar. 3, 1941 |